United States Patent
Glebov et al.

(10) Patent No.: US 8,090,266 B2
(45) Date of Patent: Jan. 3, 2012

(54) OPTICALLY COUPLING COMPONENTS OF A TRANSCEIVER

(75) Inventors: Alexei L. Glebov, San Mateo, CA (US); Shigenori Aoki, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 840 days.

(21) Appl. No.: 11/944,700

(22) Filed: Nov. 26, 2007

(65) Prior Publication Data

US 2009/0136236 A1    May 28, 2009

(51) Int. Cl.
*H04B 10/14* (2006.01)
*G02B 6/42* (2006.01)

(52) U.S. Cl. ........ 398/139; 398/135; 398/138; 398/141; 385/15; 385/14; 385/31; 385/39

(58) Field of Classification Search ................. 398/135, 398/138, 139, 144, 156, 158; 385/14–131
See application file for complete search history.

(56) References Cited

U.S. PATENT DOCUMENTS

| | | | | |
|---|---|---|---|---|
| 5,861,444 A * | 1/1999 | Tsukamoto et al. | ............ | 522/99 |
| 6,027,255 A * | 2/2000 | Joo et al. | ............ | 385/88 |
| 6,530,698 B1 * | 3/2003 | Kuhara et al. | ............ | 385/88 |
| 6,733,190 B2 * | 5/2004 | Kuhara et al. | ............ | 385/94 |
| 7,092,603 B2 | 8/2006 | Glebov et al. | ............ | 385/51 |
| 2001/0026660 A1 * | 10/2001 | Asakura et al. | ............ | 385/47 |
| 2004/0206988 A1 * | 10/2004 | Glebov | ............ | 257/244 |
| 2004/0234210 A1 * | 11/2004 | Nagasaka et al. | ............ | 385/88 |

* cited by examiner

*Primary Examiner* — Li Liu
(74) *Attorney, Agent, or Firm* — Baker Botts L.L.P.

(57) ABSTRACT

An apparatus comprises one or more electro-optical coupling modules. An electro-optical coupling module comprises a diode, a flexible optical coupling element, a reflective surface, and an optical fiber. The diode performs an electro-optical conversion on a signal. The flexible optical coupling element communicates the signal between the diode and the reflective surface. The reflective surface reflects the signal between the flexible optical coupling element and the optical fiber.

19 Claims, 5 Drawing Sheets

OPTICALLY COUPLING COMPONENTS OF A TRANSCEIVER

TECHNICAL FIELD

This invention relates generally to the field of optical signals and more specifically to optically coupling components of a transceiver.

BACKGROUND

Transceivers in an optical network may include optical connectors that transmit signals between optical fibers and active components, such as laser diodes and photo detectors. Known optical connectors include microlenses. In certain situations, however, microlenses may have a high coupling loss, low tolerance to misalignment, and low tolerance to changes due to external conditions such as temperature and mechanical strains.

SUMMARY OF THE DISCLOSURE

In accordance with the present invention, disadvantages and problems associated with previous techniques for optically coupling components of a transceiver may be reduced or eliminated.

According to one embodiment of the present invention, an apparatus comprises one or more electro-optical coupling modules. An electro-optical coupling module comprises a diode, a flexible optical coupling element, a reflective surface, and an optical fiber. The diode performs an electro-optical conversion on a signal. The flexible optical coupling element communicates the signal between the diode and the reflective surface. The reflective surface reflects the signal between the flexible optical coupling element and the optical fiber.

Certain embodiments of the invention may provide one or more technical advantages. A technical advantage of one embodiment may be that the optical coupler is flexible. The flexibility provides high tolerance to misalignment and to changes caused by external conditions.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1A:
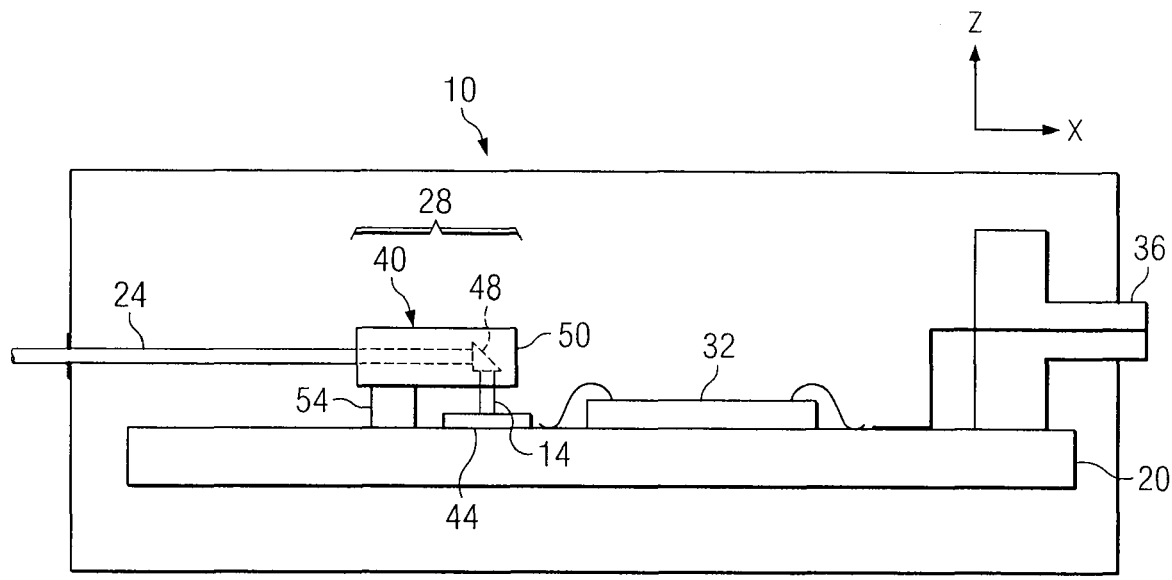
FIGS. 1A and 1B illustrate one embodiment of a transceiver system that includes one or more flexible optical coupling elements.
Figure 1B:
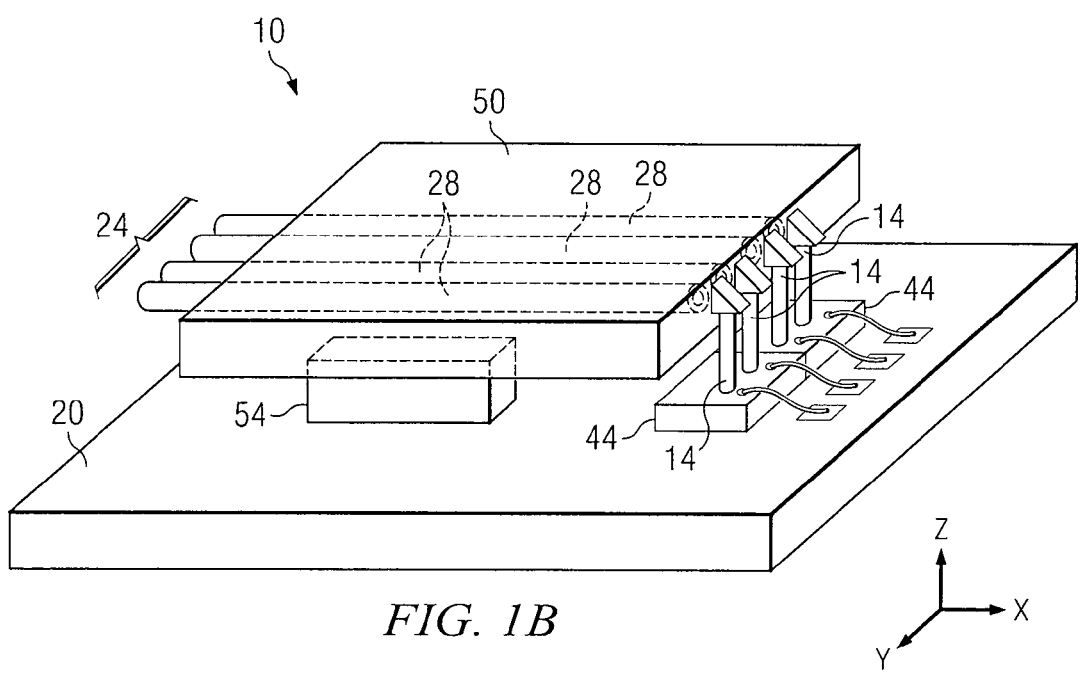

FIGS. 1A and 1B illustrate one embodiment of a transceiver system 10 that includes one or more flexible optical coupling elements 14. In the embodiment, transceiver system 10 converts electrical signals to optical signals and optical signals to electrical signals. Flexible optical coupling elements 14 optically couple optical fibers with photodiodes and laser diodes.

In one embodiment, transceiver system 10 receives and transmits light beams that operate as optical signals in an optical network, such as a Storage Area Network (SAN), a Local Area Network (LAN), an access network, a server cluster, or other network operable to communicate optical signals. The optical signals communicate information such as voice, data, audio, video, multimedia, and/or other information, and may have a wavelength in the range of 600 to 1600 nanometers, such as 850, 1310, or 1550 nanometers.

Transmission of a signal between a first entity and a second entity refers to transmission of the signal from the first entity to the second entity and/or transmission of the signal from the second entity to the first entity. Entities are optically coupled if an optical signal can be transmitted between the entities.

In the illustrated embodiment, transceiver system 10 includes components such as a substrate 20, one or more optical fibers 24, one or more electro-optical (E-O) coupling modules 28, a driver 32, an electrical interface 36, a submount 50, and a support 54. An electro-optical coupling module 28 includes an optical connector 40 and an electro-optical diode 44. An optical connector 40 includes a reflective surface 48 and flexible optical coupling element 14. Support 54, electro-optical diode 44, driver 32, and electrical interface 36 are disposed outwardly from substrate 20. Optical connector 40 is disposed outwardly from support 54 and electro-optical diode 20. Optical fiber 24, optical connector 40, and electro-optical diode 44 are optically coupled.

In one embodiment of operation, in one direction, optical connector 40 receives an optical signal from optical fiber 24. Optical connector 40 reflects the signal at an angle (for example, approximately 90 degrees) towards flexible optical coupling element 14. Flexible optical coupling element 14 transmits the signal to electro-optical diode 44. In this direction, electro-optical diode 44 represents a photodiode that transforms the optical signal to an electrical signal. Driver 32 receives the electrical signal and sends the signal to electrical interface 36.

In the embodiment of operation, in the other direction, electrical interface 36 receives an electrical signal and transmits the signal to driver 32. Driver 32 transmits the electrical signal to electro-optical diode 44. In this direction, electro-optical diode 44 represents a laser diode that transforms the electrical signal to an optical signal. The optical signal is directed to flexible optical coupling element 14. Flexible optical coupling element 14 communicates a signal through optical connector 40, which reflects the signal at an angle (for example, approximately 90 degrees) towards optical fiber 24.

Turning now to the components of the illustrated embodiment, substrate 20 supports other components. Substrate 20 may comprise any suitable material, for example, a circuit board, such as a printed circuit board (PCB). Optical fibers 24 transmit optical signals and may have any suitable numerical aperture, for example, numerical apertures in the range of 0.1 to 0.5, such as 0.48, or 0.39. Optical fibers 20 may be replaced by a fiber array.

An electro-optical coupling module 28 optically couples an optical fiber 24 to an electro-optical diode 44. Electro-optical coupling module 20 includes an optical connector 40 and an electro-optical diode 44. Optical connector 40 includes reflective surface 48 and flexible optical coupling element 14. Optical fiber 24 is optically coupled to reflective surface 48. Reflective surface 48 is disposed outwardly from and is optically coupled to optical coupling element 14. Flexible optical coupling element 14 is disposed outwardly from and is optically coupled to diode 44.

In certain embodiments, electro-optical coupling module 20 may change the propagation direction of the signal by any suitable angle, for example, an angle in the ranges of approximately 0 to 45, 45 to 85, 85 to 95 (such as 90), 95 to 135, or 135 to 180 degrees. In the illustrated embodiment, electro-optical coupling module 28 changes the direction of the signal approximately 90 degrees.

In some of these embodiments, reflective surface 48 may be used to change the propagation direction. Reflective surface 48 reflects the signal between optical coupling element 14 and optical fiber 24, for example, either from optical fiber 24 towards optical coupling element 14 or from optical coupling element 14 towards optical fiber 24. Reflective surface 48 may have any suitable tilt angle with respect to direction x. For example, the tilt angle may be between 40 to 60 degrees with respect to direction x. For example, the tilt angle may be approximately 45, 50 or 54 degrees.

Flexible optical coupling element 14 transmits the signal between diode 44 and reflective surface 48, for example, either from reflective surface 48 to diode 44 or from diode 44 to reflective surface 48. Optical coupling element 14 may have any suitable dimensions appropriate for system 10. The dimensions may depend upon the openings of the optical interface of diode 44. For a laser diode, the diameter of optical coupling element 14 may be equal to or larger than the laser diode opening and equal to or smaller than the diameter of optical fiber 24. For a photodiode, the diameter of optical coupling element 14 may be equal to or smaller than the laser diode opening and equal to or larger than the diameter of optical fiber 24. For example, if the laser diode opening is 10 micrometers, the photodiode opening is 70 micrometers, and the fiber core is 50 micrometers, then coupling element 14 may be 50 micrometers in diameter and 150 micrometers in length.

Electro-optical diode 44 performs an electro-optical conversion on a signal. Electro-optical conversion refers to converting an optical signal to an electrical signal or converting an electrical signal to an optical signal. Examples of diodes include photodiodes and laser diodes. Drivers 32 control the voltage or current of diode 44. Electrical interface 36 receives electrical signals for system 10 and/or transmits electrical signals from system 10. Mechanical support 54 provides passive alignment control in direction z.

Modifications, additions, or omissions may be made to system 10 without departing from the scope of the invention. The components of system 10 may be integrated or separated. Moreover, the operations of system 10 may be performed by more, fewer, or other components. For example, the operations of an electro-optical diode 44 may be performed by more than one component. As used in this document, "each" refers to each member of a set or each member of a subset of a set.

Figure 2:
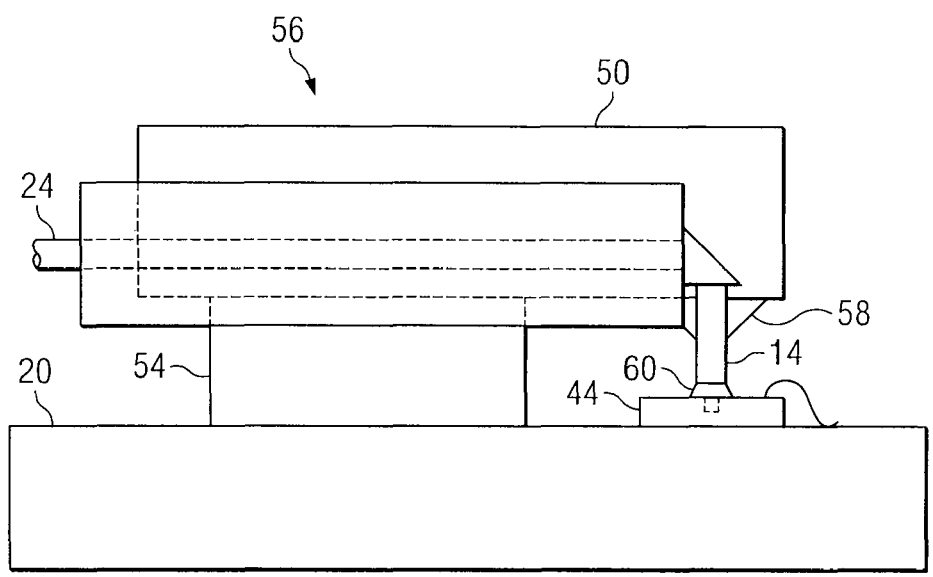
FIG. 2 illustrates one embodiment of a portion of the transceiver system of FIGS. 1A and 1B.

FIG. 2 illustrates one embodiment of a portion 56 of transceiver system 10 of FIGS. 1A and 1B. In the embodiment, portion 56 includes an index matching fluid 58 and an optical gel 60.

Index matching fluid 58 optically and/or mechanically couples optical coupling element 14 and optical fiber 24 to maintain the position of optical coupling element 14 with respect to optical fiber 24. Index matching fluid 58 may also provide index matching between coupling element 14 and optical fiber 24.

Optical gel 60 optically and/or mechanically couples diode 44 and flexible optical coupling element 14 to maintain the position of diode 44 with respect to coupling element 14. Optical gel 60 may comprise an epoxy that provides index matching between coupling element 14 and diode 44.

Figures 3A, 3B:
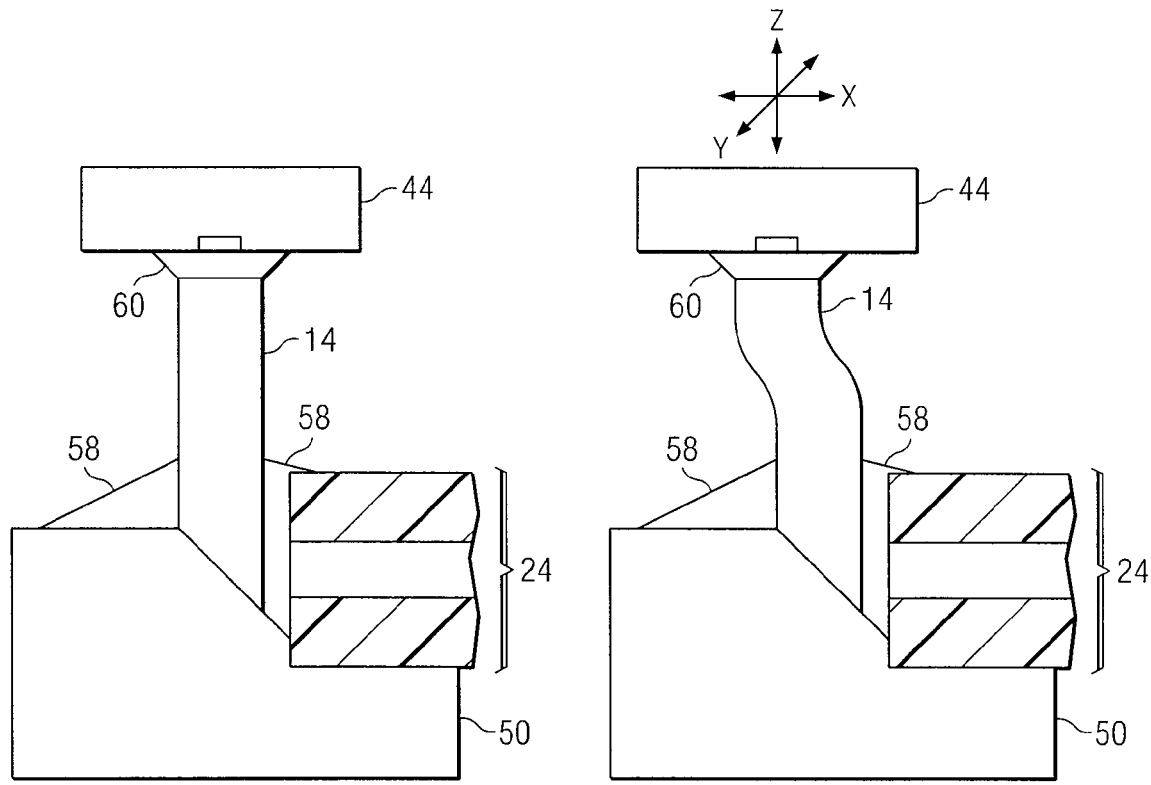
FIGS. 3A and 3B illustrate a flexible optical coupling element operating when there is movement between an electro-optical diode and a submount.

FIGS. 3A and 3B illustrate flexible optical coupling element 14 operating when there is movement between electro-optical diode 44 and submount 50. FIG. 3A illustrates a first position of electro-optical diode 44 and submount 50. The first position may be the designed position.

FIG. 3B illustrates a second position of electro-optical diode 44 and submount 50. In the second position, electro-optical diode 44 is displaced in direction x with respect to submount 50. The second position may be the result of system 10 reacting to thermal or mechanical changes. Optical coupling element 14 is flexible, so optical coupling element 14 still optically couples electro-optical diode 44 and optical fiber 24.

Figure 4A:
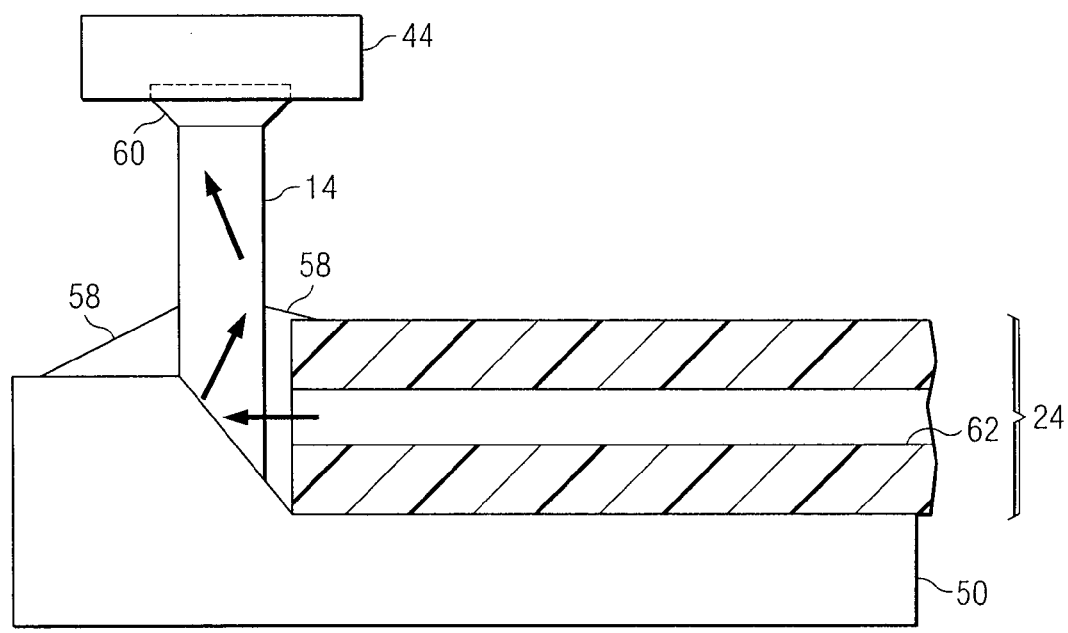
FIGS. 4A and 4B illustrate examples of placement of an optical coupling element with respect to the core of an optical fiber.
Figure 4B:
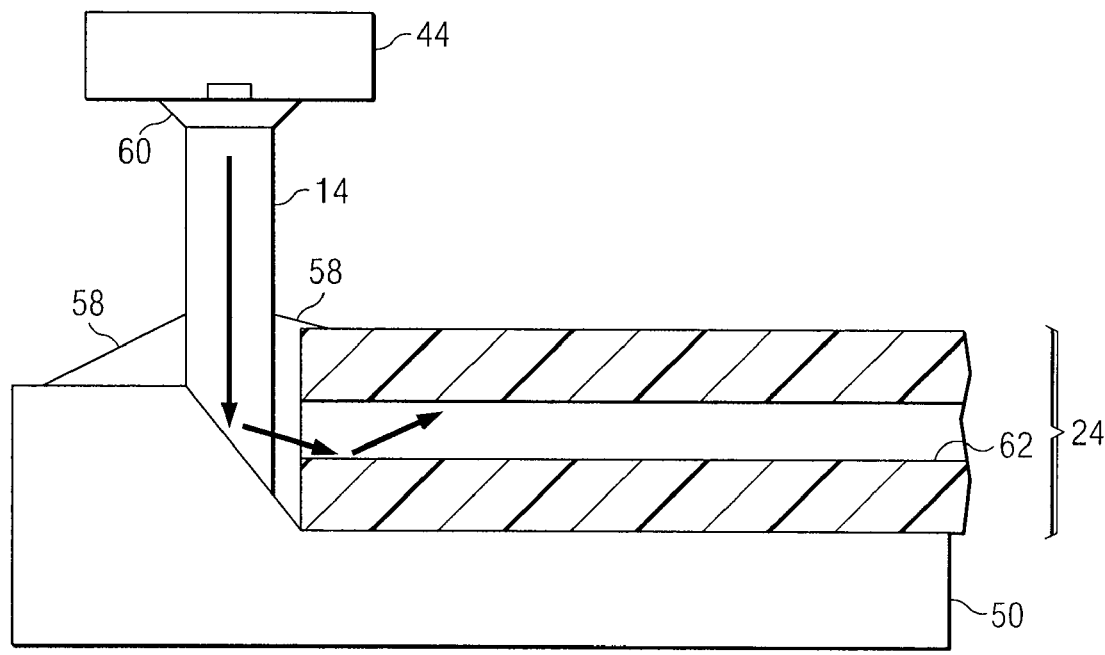

FIGS. 4A and 4B illustrate examples of placement of optical coupling element 14 with respect to the core 62 of optical fiber 24. In the examples, the reflective surface 48 may have a tilt angle of approximately 54 degrees with respect to direction x. Also, the refractive index contrast of the walls of optical coupling element 14 may be relatively high, for example, in the range of 0.5% to total internal reflection, where the internal reflection is determined by the interface between the air and the material of optical coupling element 14. Accordingly, coupling element 14 can accept large incident angles.

FIG. 4A illustrates placement in a photodiode. Optical coupling element 14 is positioned substantially directly in front of core 62 of optical fiber 24. In the example, optical coupling element 14 can accept large incident angles, so the signal is confined in optical coupling element 14.

FIG. 4B illustrates placement in a laser diode. Optical coupling element 14 is positioned slightly upward in direction z relative to core 62 of optical fiber 24 by a distance of in the range of 1 to 50 micrometers. The positioning may facilitate optical coupling between optical coupling element 14 and optical fiber 24 if the tilt angle of reflective surface 48 is greater than 45 degrees.

In one embodiment, reflective surface 48 has a tilt angle that is not 45 degrees, so the optical signal enters optical fiber 24 with an incident angle that is not parallel to core 62. In the example, reflective surface 48 has a tilt angle of approximately 54 degrees, so the optical signal enters optical fiber 24 with an incident angle of approximately 18 to 19 degrees. Optical fiber 24 may be selected to accommodate this incident angle. As an example, optical fiber 24 may have a numerical aperture that can accommodate the incident angle. As another example, the end of optical fiber 24 may be tapered to accommodate the incident angle, as described in more detail with reference to FIG. 5. As yet another example, the tilt angle of reflective surface 48 may be selected to improve the optical coupling efficiency. For example, the tilt angle may be approximately 45 degrees, but the angle need not be 45 degrees.

Figure 5:
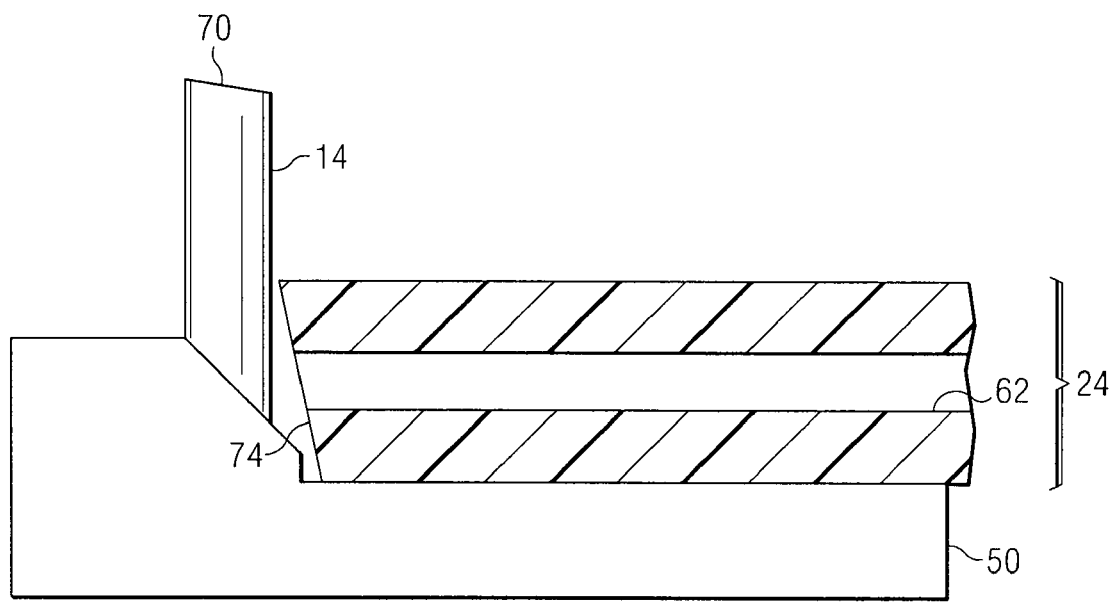
FIG. 5 illustrates tapered ends that may be used to accommodate different incident angles.

FIG. 5 illustrates tapered ends that may be used to accommodate different incident angles. A tapered end may refer to an end that is cut at an angle other than perpendicular to core 62, and the taper angle is measured from a plane perpendicular to core 62. In the illustrated embodiment, optical coupling element 14 has a tapered end 70 that is proximate to laser diode 44. Optical fiber 24 has a tapered end 74 that is proximate to reflective surface 48. Any suitable taper angle may be used, for example, an angle between 0 to 10 degrees, such as approximately 8 degrees. The tapered ends bend the beam closer to the fiber propagation direction. Accordingly, tapering may utilize fibers 24 with a lower numerical aperture.

Figure 7:
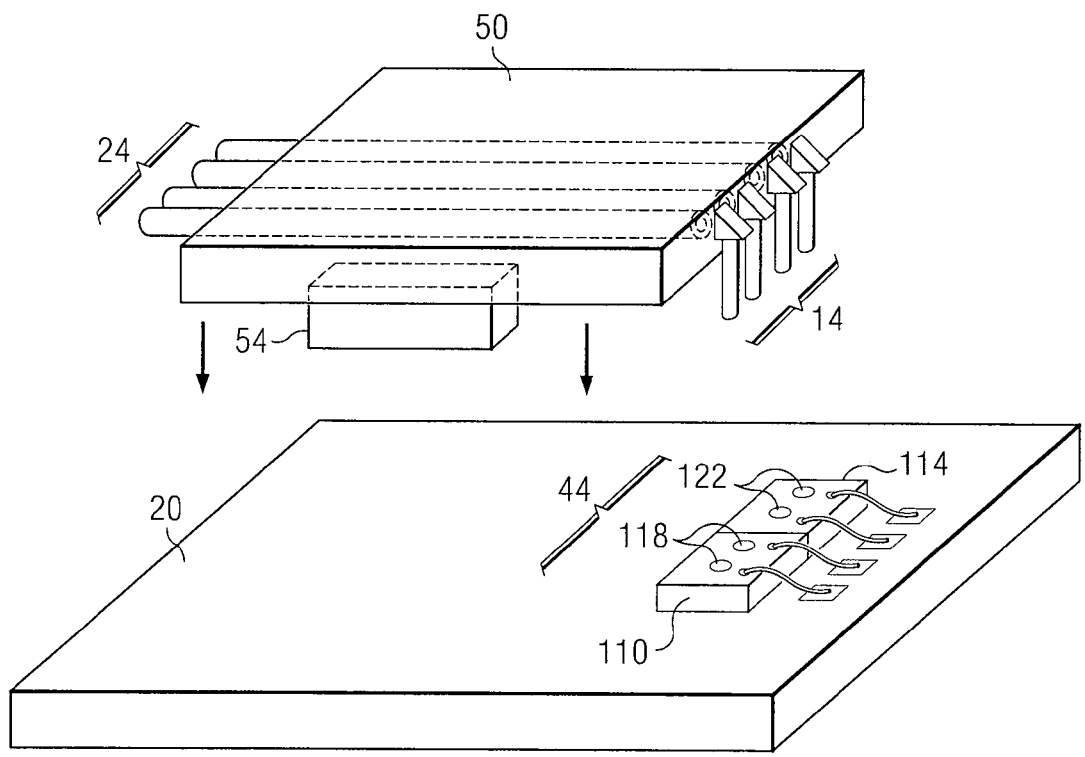
FIGS. 6A through 7 illustrate a method of fabricating a flexible optical coupling element outwardly from a substrate.
Figure 6A:
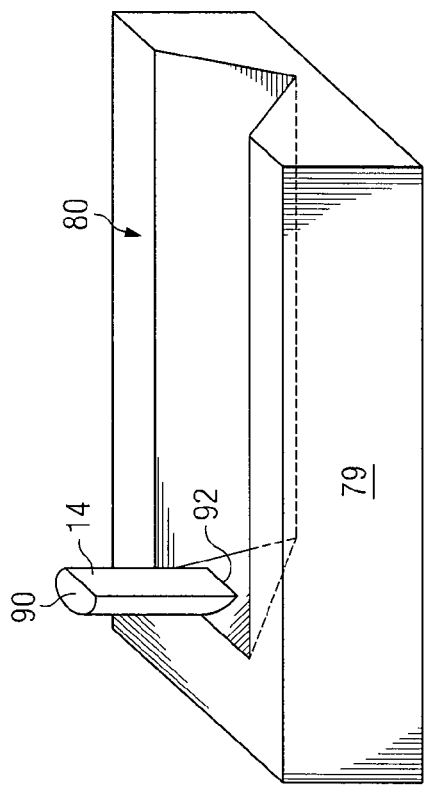

FIGS. 6A through 7 illustrate a method of fabricating flexible optical coupling element 14 outwardly from substrate 79, which operates as submount 50.

FIG. 6A illustrates a groove 80 comprising a depression of a surface of substrate 79. Substrate 79 may comprise any suitable material, for example, silicon. Groove 80 may have any suitable cross-section shape that allows for placement of fiber 24 at least partially within groove 80. In the illustrated example, groove 79 has a V-shaped cross-section. In other examples, groove 79 may have a U-shaped or square-shaped cross-section.

Groove 80 may be formed in any suitable manner. For example, groove 80 may be etched by patterning substrate 79 with an opening for groove 80, and then wet etching substrate 79 in a chemical solution. The chemical solution (such as a potassium hydroxide (KOH) solution) may provide strong anisotropy. Multiple grooves 80 may be formed at the wafer level to yield any suitable number, for example, hundreds, of substrates 79 from one wafer.

Groove 80 has a surface 84 to which optical coupling element 14 is to be coupled. Surface 84 may operate as a support for reflective surface 48, and may have a tilt angle approximate to the tilt angle of reflective surface 48. A reflective layer 86 may be disposed outwardly from V groove 80. Reflective layer 86 may comprise a metal layer with a reflective surface that increases the reflectivity of surface 84.

In one embodiment, lithographic masking and wet etching in potassium hydroxide+isopropyliodide (KOH+IPI) solutions may be used to form a 45 degree tilt angle. The etch mask patterns may be aligned along specific crystal lithographic directions.

Figure 6B:
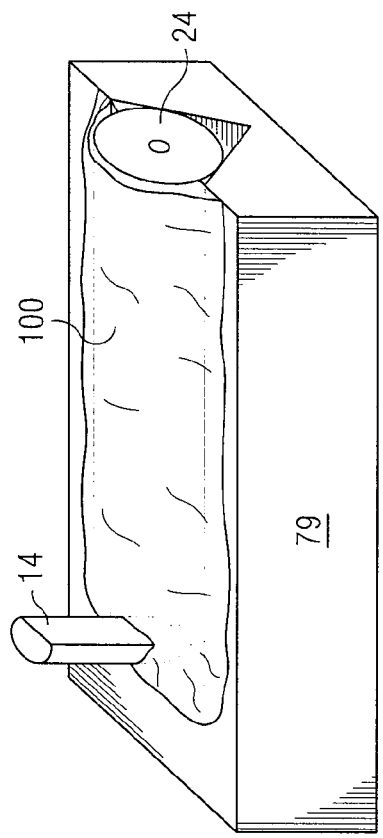

FIG. 6B illustrates placement of optical coupling element 14 outwardly from surface 84. In the illustrated embodiment, optical coupling element 14 may have a generally cylindrical shape with a planar surface 88 and ends 90 and 92. Planar surface 88 may have a substantially planar shape to accommodate optical fiber 24. End 92 may have a taper that accommodates the angle of surface 84. For example, the taper angle may be the difference between the tilt angle of surface 84 and 90 degrees. In the illustrated embodiment, the walls of optical coupling element 14 are substantially straight. The walls, however, need not be straight. The walls may taper, or curve, towards end 90 and/or end 92.

Optical coupling element 14 may be fabricated in any suitable manner. For example, optical coupling element 14 may be fabricated from a photo-patternable polymer. Polymer may be disposed outwardly from substrate 79. Direct lithography may then be used to pattern optical coupling element 14. Optical coupling element 14 may be positioned outwardly from groove 80 by standard photolithography. After optical coupling element 14 has been placed outwardly from groove 80 of substrate 79 of a wafer, the wafer may be diced.

Figure 6C:
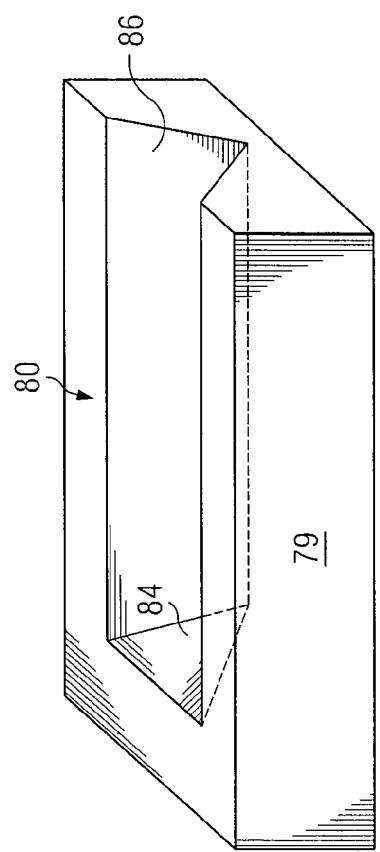

FIG. 6C illustrates fiber 24 disposed at least partially within groove 80. Positioning of fiber core 62 of fiber 24 with respect to optical coupling element 14 may be as described with reference to FIGS. 4A and 4B.

Figure 6D:
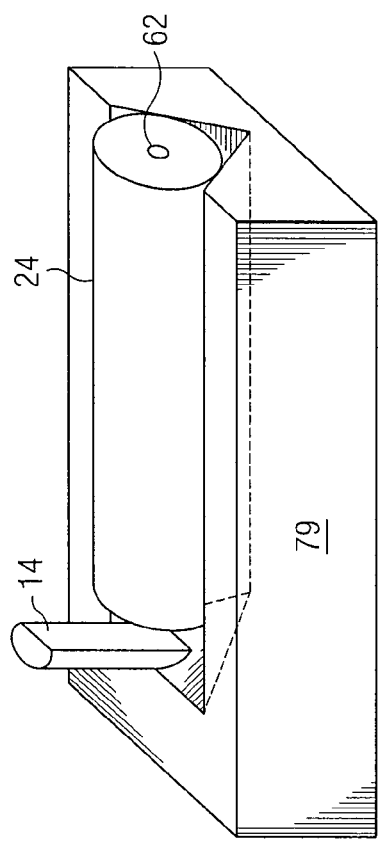

FIG. 6D illustrates placement of an adhesive 100 outwardly from groove 80. Adhesive 100 may optically and/or mechanically couple optical coupling element 14 and fiber 24 to maintain the position of optical coupling element 14 with respect to fiber 24. Adhesive 100 may also comprise an optical index matching material that provides refractive index matching between optical coupling element 14 and fiber 24.

FIG. 7 illustrates placement of electro-optical coupling modules 28 on substrate 20. Mechanical support 54 may be mechanically coupled to submount 50. In the illustrated embodiment, electro-optical diodes 44 include laser diodes 110 and photodiodes 114. Laser diodes have openings 118, and photodiodes 114 have openings 122. The ends of optical coupling elements 14 may be immersed in epoxy, and then optical coupling elements 14 may be aligned and placed on openings 118 and 122. Techniques such as lateral alignment wedge techniques may be used to improve alignment tolerances.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that the optical coupler is flexible. The flexibility provides high tolerance to misalignment and to changes caused by external conditions.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
   one or more electro-optical coupling modules, an electro-optical coupling module comprising:
   a substrate;
   a diode mounted on the substrate;
   a flexible optical coupling element coupled to the diode;
   a submount having a surface with a depression, the flexible optical coupling element disposed outwardly from the depression;
   a reflective surface coupled to the flexible optical coupling element and to the submount; and
   an optical fiber disposed at least partially within the depression of the submount and coupled to the reflective surface;
   the diode operable to perform an electro-optical conversion on a signal;
   the flexible optical coupling element operable to communicate the signal between the diode and the reflective surface and comprised of a flexible material such that the flexible optical coupling element is configured to allow relative movement of the submount with respect to the substrate; and
   the reflective surface operable to reflect the signal between the flexible optical coupling element and the optical fiber.

2. The apparatus of claim 1, wherein, for at least one electro-optical coupling module:
   the reflective surface is operable to reflect the signal between the flexible optical coupling element and the optical fiber by reflecting the signal from the optical fiber towards the flexible optical coupling element;

the flexible optical coupling element is operable to communicate the signal between the diode and the reflective surface by communicating the signal from the reflective surface to the diode; and the diode comprises a photodiode operable to perform the electro-optical conversion on the signal by converting the signal from an optical signal to an electrical signal.

3. The apparatus of claim 1, wherein, for at least one electro-optical coupling module:

the diode comprises a laser diode operable to perform the electro-optical conversion on the signal by converting the signal from an electrical signal to an optical signal;

the flexible optical coupling element is operable to communicate the signal between the diode and the reflective surface by communicating the signal from the diode to the reflective surface; and the reflective surface is operable to reflect the signal between the flexible optical coupling element and the optical fiber by reflecting the signal from the flexible optical coupling element towards the optical fiber.

4. The apparatus of claim 1, at least one electro-optical coupling module further comprising:

an optical gel disposed between the diode and the flexible optical coupling element.

5. The apparatus of claim 1, the reflective surface further operable to reflect the signal at an angle of approximately 90 degrees.

6. The apparatus of claim 1, the flexible optical coupling element having a tapered end to communicate the signal between the flexible optical coupling element and the diode.

7. The apparatus of claim 1, wherein:
the diode comprises a laser diode; and
the reflective surface is positioned substantially directly in front of the core of the optical fiber.

8. The apparatus of claim 1, wherein:
the diode comprises a photodiode; and
the reflective surface is positioned to direct the signal at an angle to the core of the optical fiber.

9. The apparatus of claim 1, further comprising a submount having a surface with a depression formed by etching, wherein:

the depression has a surface that supports the reflective surface; and the flexible optical coupling element is disposed outwardly from the surface.

10. The apparatus of claim 1, wherein the flexible optical coupling element has a substantially cylindrical shape.

11. A method comprising:
forming one or more electro-optical coupling modules, an electro-optical coupling module formed by:
mounting a diode on a substrate;
coupling a flexible optical coupling element to the diode, the diode operable to perform an electro-optical conversion on a signal;
coupling a reflective surface to the flexible optical coupling element and to a submount;
disposing the flexible optical coupling element outwardly from a depression in a surface of a submount; and disposing an optical fiber at least partially within the depression of the submount and coupling the optical fiber to the reflective surface;

the diode, the flexible optical coupling element, the reflective surface, and the optical fiber positioned wherein:

the flexible optical coupling element is operable to communicate the signal between the diode and the reflective surface and comprised of a flexible material such that the flexible optical coupling element is configured to allow relative movement of the submount with respect to the substrate; and the reflective surface operable is to reflect the signal between the flexible optical coupling element and the optical fiber.

12. The method of claim 11, wherein, for at least one electro-optical coupling module:

the reflective surface is operable to reflect the signal between the flexible optical coupling element and the optical fiber by reflecting the signal from the optical fiber towards the flexible optical coupling element;

the flexible optical coupling element is operable to communicate the signal between the diode and the reflective surface by communicating the signal from the reflective surface to the diode; and the diode comprises a photodiode operable to perform the electro-optical conversion on the signal by converting the signal from an optical signal to an electrical signal.

13. The method of claim 11, wherein, for at least one electro-optical coupling module:

the diode comprises a laser diode operable to perform the electro-optical conversion on the signal by converting the signal from an electrical signal to an optical signal;

the flexible optical coupling element is operable to communicate the signal between the diode and the reflective surface by communicating the signal from the diode to the reflective surface; and the reflective surface is operable to reflect the signal between the flexible optical coupling element and the optical fiber by reflecting the signal from the flexible optical coupling element towards the optical fiber.

14. The method of claim 11, further comprising:
for at least one electro-optical coupling module, disposing an optical gel between the diode and the flexible optical coupling element.

15. The method of claim 11, the reflective surface further operable to reflect the signal at an angle of approximately 90 degrees.

16. The method of claim 11, the flexible optical coupling element having a tapered end to communicate the signal between the flexible optical coupling element and the diode.

17. The method of claim 11:
wherein the diode comprises a laser diode; and
further comprising positioning the reflective surface substantially directly in front of the core of the optical fiber.

18. The method of claim 11:
wherein the diode comprises a photodiode; and
further comprising positioning the reflective surface to direct the signal at an angle to the core of the optical fiber.

19. The method of claim 11, wherein the flexible optical coupling element has a substantially cylindrical shape.

* * * * *